March 29, 1955 — J. L. BONANNO — 2,705,113
FISHING REEL
Filed July 6, 1949 — 2 Sheets-Sheet 2
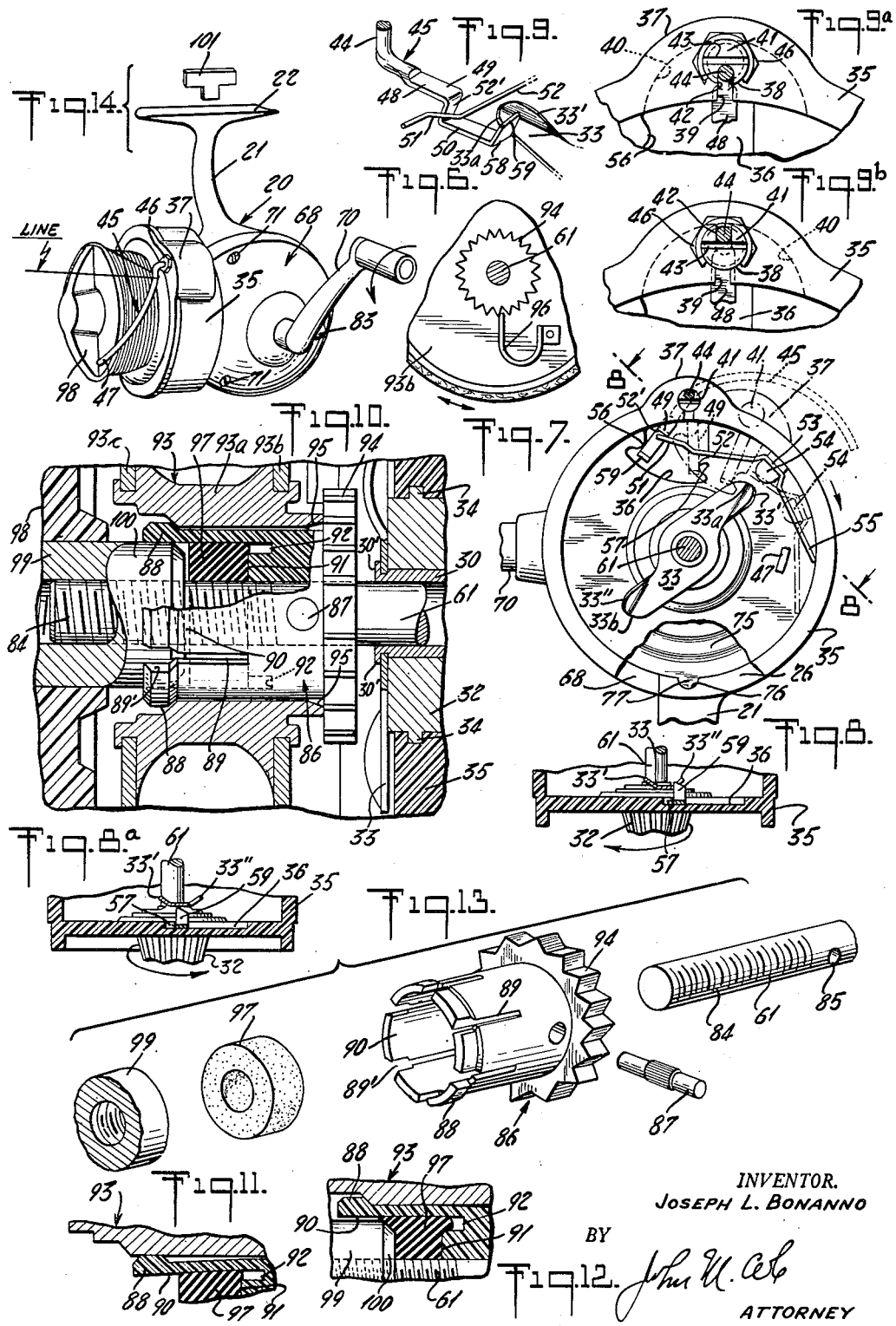
INVENTOR.
JOSEPH L. BONANNO
BY
ATTORNEY

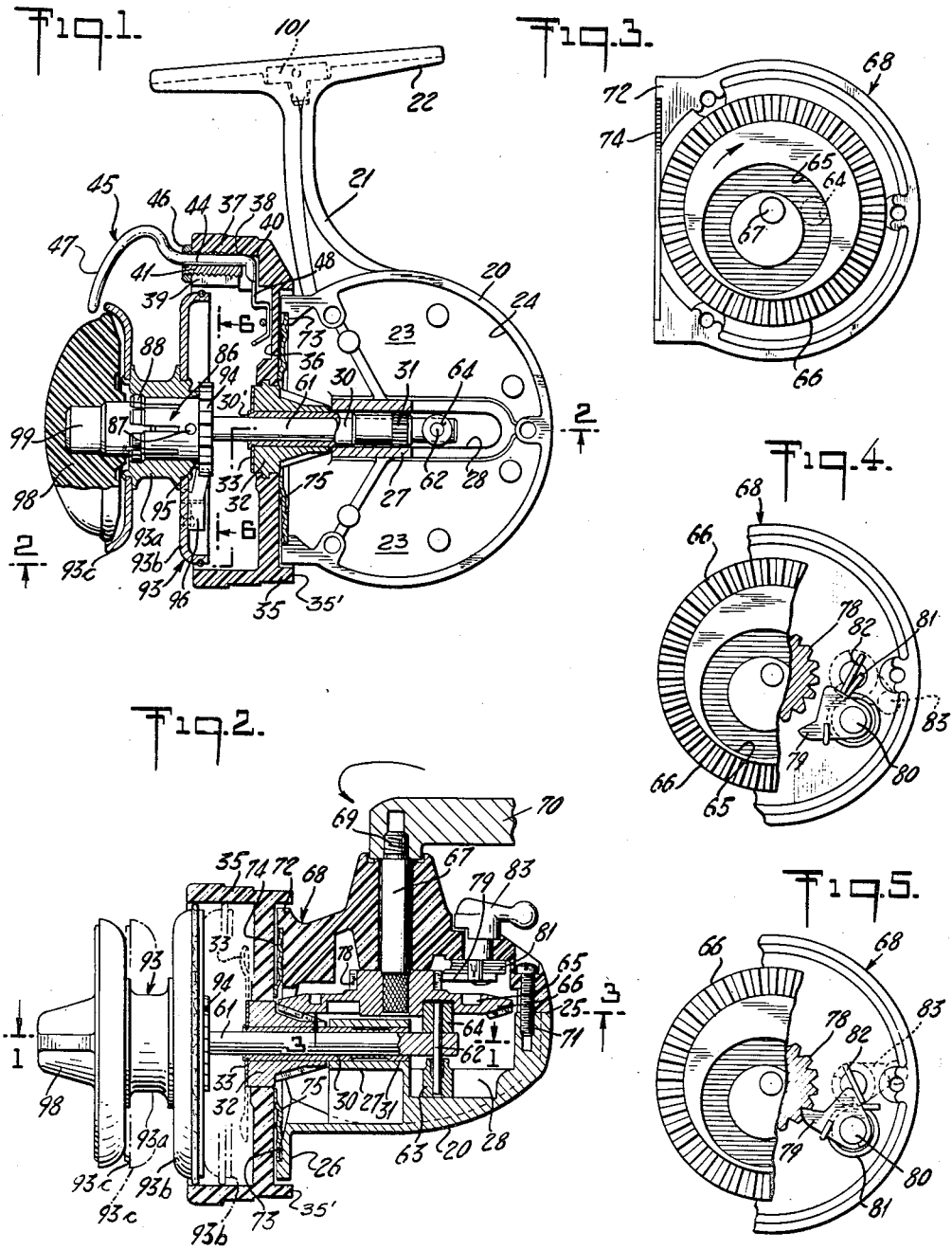

United States Patent Office 2,705,113
Patented Mar. 29, 1955

2,705,113

FISHING REEL

Joseph L. Bonanno, Madison, N. J., assignor to Airex Manufacturing Co., Inc., Long Island City, N. Y., a corporation of New York Application July 6, 1949, Serial No. 103,221

2 Claims. (Cl. 242—84.4)

The present invention relates to fishing reels and is more particularly directed toward fishing reels of the spinning reel type. The present invention contemplates spinning reels constructed in the main from die cast and plastic parts so as to be capable of mass production at low cost.

In spinning reels of the type to which the present invention is directed, the line is wound and unwound from a spool normally held against rotation. The line is wound onto the spool by a revolving cup carrying a pickup finger which can be manually shifted to a position where it frees the line to pass off the stationary spool, but shiftable, when the cup is revolved in the direction to wind up line, to a position to engage the line and guide it onto the spool as the cup is revolved. In reels of this character, the spool is carried on a non-rotatable reciprocating shaft and a winding crank is provided with mechanism for reciprocating the spool shaft and rotating the cup.

The pull exerted by the line is transmitted to the spool and tends to unwind the line off the spool. This unwinding is resisted by the operator holding on the winding crank or by anti-reverse mechanism where the same is employed. To limit the pull which can be exerted on the line to a safe amount, it is desirable to provide such reels with friction brake mechanism adjustable at the will of the operator.

An object of the invention is to provide an improved housing, line pickup revolving and spool traversing arrangement in a spinning reel.

Other and further objects of the invention will appear as the description proceeds.

The accompanying drawings show, for purposes of illustrating the present invention, one embodiment in which the invention may take form, it being understood that the drawings are illustrative of the invention rather than limiting the same.

In these drawings,

Figure 1 is a side elevational view of the reel with housing cover removed and parts in section along the line 1—1 of Fig. 2;

Figure 2 is a sectional view on the broken line 2—2 of Fig. 1;

Figure 3 is an elevational view taken in the direction of the arrow 3 of Fig. 2 to show the main driving gear and inner face of the housing cover;

Figure 4 is a view similar to Fig. 3 with the driving gear broken away to show the anti-reverse mechanism in release position;

Figure 5 is a figure similar to Fig. 4, showing the anti-reverse mechanism engaged;

Figure 6 is a sectional view on the line 6—6 of Fig. 1, showing the inside of the winding spool and the click mechanism;

Figure 7 is an elevational view of the spool cup and of the pickup finger, showing the latter in line-winding position in full lines, in line-release position in dotted lines, and showing in dot and dash lines the parts in position to engage the throw on arm, a portion of the cup being broken away to show the housing and cover;

Figures 8 and 8a are sections taken on the line 8—8 of Fig. 7, with the parts in dot and dash line position therein, Fig. 8 showing the operation of the throw on arm in restoring the line pickup when the reel is operated to wind in or retrieve the line, and Fig. 8a showing the operation of these parts when the spool cup is turned in the other direction;

Figure 9 is a fragmentary perspective view of the pickup finger;

Figures 9a and 9b are fragmentary views showing the pickup finger mounting on the spool cup;

Figure 10 is an enlarged sectional view on the line 1—1, Fig. 2, showing the friction brake mechanism, spool, and spool shaft, the parts being in position to free the spool from frictional drag;

Figure 11 is a fragmentary view showing the spool partly moved to position on the friction brake;

Figure 12 is a fragmentary sectional view showing the friction brake adjusted to impose friction;

Figure 13 is an exploded perspective view of parts employed in the friction brake mechanism; and Figure 14 is a perspective view of the assembled reel.

In the construction shown in the drawings, all parts of the reel are directly or indirectly supported from a body member 20 in the form of a die casting. This casting has a bracket or arm 21 with a seat 22 to facilitate securing it to the fishing rod. The body member 20 is recessed as indicated generally at 23. When the reel is in use on the rod, the recesses 23 extend laterally. They open upwardly when the reel is in the position shown in Fig. 2.

The casting 20 has generally circular side walls 24 extending up to a common level as indicated at 25 (Fig. 2). It is provided at the forward end with a flange 26 at right angles to the plane of the surface 25, and centered about the axis on which the section of Fig. 1 is taken. The flange includes a radially extending fin and axial extensions at the sides of the body as shown in Figure 1. The casting 20 has a tubular element 27 whose axis is spaced some distance below the face 25 to be coaxial with the periphery of the flange 26. The casting 20 also has a groove 28 parallel with the axis of the tube 27 and displaced from this axis as more clearly shown in Fig. 2.

A tubular bushing or sleeve 30 has a knurled end 31 which is driven into the material of the tubular element 27 so as to anchor the bushing or sleeve 30 against movement relative to the casting. The bushing or sleeve 30 receives a die cast pinion 32 which is held in place by a resilient sheet metal throw-on arm 33 by upsetting the extreme end 30' of the sleeve 30 against it. The die cast pinion 32 has anchorage lugs, two of which appear at 34 (Fig. 10), and this die casting is employed as an insert in the mold in which a molded spool cup 35 is formed. The cup 35 and gear 32 are therefore held in place on the sleeve so that they can be rotated about the axis of the sleeve but cannot shift longitudinally.

The cup 35 has a rearwardly extending circular flange 35' about the flange 26, a forwardly opening cavity 36, and an enlargement 37. Opposite the cavity this enlargement is drilled and tapped as indicated at 38, slotted as indicated at 39 and undercut as indicated at 40. The tapped hole receives a bushing 41 longitudinally slotted as indicated at 42 and provided with screw driver slots at 43. When the bushing is threaded all the way and, except for the last half turn, the slots 39 and 42 are in alignment as indicated in Fig. 9a so as to receive the straight portion 44 of a bent wire pickup finger 45. After this straight or shank portion of the pickup finger is inserted into the slots, the bushing is turned a half revolution as indicated in Fig. 9b and a locknut 46 is threaded onto the exposed end of the bushing so as to lock the bushing in place.

The outer end 47 of the pickup finger (for line L) extends beyond the spool cup as indicated in Figs. 1, 2 and 14. Its inner end 48 is flattened and bent to form arm 49 having a configuration shown more clearly in Fig. 9. The lower portion 50 of this arm is under the end 51 of a spring 52 whose mid portion 53 is anchored under a lug 54 formed in the cup molding 35 and whose free end 55 bears against the wall of the cup. The end 51 of the spring is bent to form a hump as indicated more clearly in Figs. 7 and 9 and bears against the offset portion 52' of the arm 49 to hold it in either the full line or dotted line position of Fig. 7. The user can readily shift the pickup finger 45 and arm 49 back and forth as desired and it remains in the set position against stop 56 or 57 at the sides of the cavity 36 unless manually shifted, or the spool cup is operated in a clockwise direction (Fig. 7).

The outer end 58 of the arm 49 has an upwardly extending element indicated at 59 (Figs. 8, 8a and 9). When the pickup finger is in the full line position of Fig. 7, the element 59 is out of reach of the ends 33a or 33b of the throw-on arm 33 so that the cup can revolve without interengagement of these parts. When, however, the pickup finger 45 is shifted to the dotted line position of Fig. 7, in which the finger is out of the path of the fish line L, the element 59 will engage with one of the arms 33a or 33b as the cup is turned. If the cup turns in a clockwise direction as shown in Figs. 7 and 9, the vertical face of upwardly extending element 59 will engage the arm 33a or 33b and this will shift the lever arm 49 so that it passes by the hump on the spring 52 and restores the pickup finger to the inner position. If, however, the cup is rotating in the other direction as shown in Fig. 8a, the cam element 33' or 33'' on the throw-on arm will cause the throw-on arm to flex and pass by.

The bushing or sleeve 30 receives a spool shaft 61. The inner end of this shaft receives a pin 62 (see Fig. 2) and this pin carries a roller 63 which enters the groove 28. The pin and roller permit reciprocation of the shaft 61 in the housing and prevent shaft rotation. The other end of the pin 62 carries a roller 64 which enters an eccentric groove 65 in a die cast gear member 66 having teeth in mesh with the pinion 32. The gear member 66 is carried on a shaft 67 which extends through a molded plastic housing cover 68. The outer end of the shaft 67 has a left-handed thread as indicated at 69 to receive a crank 70. The cover 68 is shaped to fit the housing member 20 and is secured to it by screws indicated at 71. The cover 68 has a circular flange element 72 which, together with the flange element 26, forms a complete circular flange adapted to revolve inside the circular flange 35'. These flanges are recessed as indicated at 73 and 74 to receive an impregnated fabric diaphragm seal 75. The housing casting is notched as indicated at 76 in Fig. 7 to receive lugs 77 formed in the diaphragm seal so that the seal cannot revolve.

The back part of the gear casting 66 is provided with ratchet teeth as indicated at 78. These teeth cooperate with a pawl 79 pivoted at 80 and urged in a clockwise direction as shown in Figs. 4 and 5 by a spring 81. The pawl 79 is shifted to the position shown in Fig. 4 by a cam 82 carried by an anti-reverse knob 83.

The end of the spool shaft 61 which extends through the spool cup is threaded as indicated at 84 and drilled as indicated at 85. A combined brake housing and click gear element 86 is received on the shaft and held in place by a pin 87. This element is preferably made of tough, resilient plastic unaffected by the heat generated during slippage, such for example as nylon. The brake housing has an open ended tubular portion thickened at the end as indicated at 88 and provided with longitudinal slits, narrow as indicated at 89 and wide as indicated at 89', so as to provide bendable segments 90. The housing has an inner shoulder 91 and a recess 92 beyond the shoulder.

A spool 93 composed of a spool body 93a, an inner spinning 93b, and an outer spinning 93c, has a bore of a proper diameter to loosely fit over the portion of the brake housing between the enlargement 88 and the click gear 94. The inner end of the spool body is slightly chamfered as indicated at 95 so that when it is pushed along the segments 90 these segments are cammed inwardly as indicated in Fig. 11. When the spool is pushed all the way on to the brake housing, the segments expand to the position of Fig. 10 so that the spool can revolve freely. The spool element 93b carries a click spring 96 cooperable with the click gear 94. A soft compressible washer 97 is received on the shaft 61. This washer is preferably made of "neoprene" 50–60 durometer test and of a size to be received in the brake housing and is brought against the shoulder 91.

The threaded end 84 of the shaft 61 receives a control knob 98 molded on an insert 99 threaded to fit the shaft. The inner end 100 of this insert is adapted, as more clearly shown in Fig. 10, to enter the brake housing member 86, but does not expand it. When, however, the knob 98 is turned to force the insert against the washer, pressure may be applied to the washer 97, which will cause the washer to deform as indicated in Fig. 12, applying pressure to fingers on the brake housing and causing them to expand and frictionally grip the spool so as to resist turning of the spool on the brake housing. This varies in accordance with the pressure which is developed by tightening the knob 98. When the knob 98 is backed off to reduce the drag, the spool is freed to turn without drag before the end of the nut 99 leaves the rubber washer. This insures friction between the insert and washer so that the knob is held against free unthreading.

The above described brake mechanism forms the subject-matter of my divisional application Serial No. 378,214 filed September 3, 1953.

A removable T-shaped key 101 is receivable in a slot in the reel seat. This key may be inserted or removed depending upon the type of seat on the rod with which the reel is to be used.

When the fishing line is wound on the spool, the user can make a cast by shifting the pickup finger out of the path of the line and manipulating the rod in the usual fashion for casting from a spinning reel. When it is desired to retrieve the line, the handle 70 is turned in counterclockwise direction as viewed in Fig. 14. This operates the pickup finger throw-on mechanism to move the pickup finger into position in which it guides the line on to the spool. The anti-reverse mechanism may be manipulated to either prevent reverse movement of the mechanism due to pull on the line or to permit it. The amount of pull which can be exerted by the line is controllable by adjustment of the knob 98.

Since it is obvious that the invention may be embodied in other forms and constructions within the scope of the claims, I wish it to be understood that the particular form shown is but one of these forms, and various modifications and changes being possible, I do not otherwise limit myself in any way with respect thereto.

What is claimed is:

1. A spinning reel comprising a body member in the form of a casting of generally cup shape except for a portion cut off at one side and having a flange of circular arc shaped contour about an axis below the top edge of the casting, a bearing tube formed therein, spaced from the flange and coaxial therewith, an upwardly opening guide slot formed in the casting parallel with the tube axis and disposed below the tube axis, a bushing non-rotatably carried in the tube and extending beyond the flange, a bevel pinion rotatably carried by the bushing, a spool cup carried by the pinion, a throw-on arm secured to the end of the bushing and holding the pinion and cup in place, a spool shaft extending through the bushing and carrying a pin entering the groove to permit reciprocation of the shaft and prevent rotation, a spool carried by the shaft and received in the spool cup, a line pickup finger carried by the cup and extending adjacent the finger throw-on mechanism carried by the cup and operable by the throw-on arm when the cup is turning in a direction to wind line onto the spool, a cover for the casting, a driving shaft carried by the cover and carrying a gear in mesh with the pinion and an eccentric drivingly connected with the pin, the cover having a flange coaxial with the body member flange, the flanges being close to the spool cup to prevent entry of dirt into the gearing.

2. A spinning reel comprising a body in the form of a casting of shallow cup shape except for a portion cut off at one side and having a circular arc-shaped flange centered about an axis below the top edge of the casting and of a diameter slightly less than the width of the body, the flange being in the form of a radially extending fin below the body and axial extensions of the body at each side of the body, a bearing tube formed therein spaced from the flange and coaxial therewith, and an upwardly opening guide slot parallel with the tube axis and disposed below the tube axis and beyond the end of the tube, a bushing non-rotatably carried in the tube and extending beyond the flange, a bevel pinion rotatably carried by the bushing, a cover for the casting, the cover having a flat face to fit the upper periphery of the body member and being secured to the latter, the cover having a flange of circular arc-shaped contour in the same plane and at the same radius as the body member flange to form a continuous annular flange, a driving shaft carried by the cover and rotatable about an axis at right angles to the axis of the tube, a bevel gear on the driving shaft and in mesh with the pinion and provided with a downwardly facing eccentric groove, a shaft reciprocably carried in the bushing and having one end extending beyond the pinion, a spool carried by said shaft end, the other end of the shaft extending beyond the tube and bushing and over the groove in the body member and carrying a cross pin, cross-pin carried rollers, one received in the eccentric groove and the other in the upwardly opening guide slot whereby the second shaft may be reciprocated and held against rotation, a spool cup carried by the pinion and having an annular skirt of substantially the diameter of the spool, the skirt extending toward the body member and cover and closely about the flanges thereon to prevent the entry of dirt into the gearing, a line pickup finger carried by the spool cup, and throw-on mechanism for actuating the finger when the cup is driven in line-winding direction.

References Cited in the file of this patent

UNITED STATES PATENTS

| | | |
|---|---|---|
| 1,053,612 | Keyes | Feb. 18, 1913 |
| 1,187,840 | Illingworth | June 20, 1916 |
| 1,364,259 | Eaton | Jan. 4, 1921 |
| 1,518,026 | Van Sluys | Dec. 2, 1924 |
| 1,612,178 | Catucci | Dec. 28, 1926 |
| 1,878,264 | Claybourn | Sept. 20, 1932 |
| 2,219,124 | Bandy | Oct. 22, 1940 |
| 2,229,470 | Pezon | Jan. 21, 1941 |
| 2,344,209 | Lowe | Mar. 14, 1944 |
| 2,495,621 | Young et al. | Jan. 24, 1950 |
| 2,498,987 | Duncan | Feb. 28, 1950 |
| 2,546,465 | Martini | Mar. 27, 1951 |
| 2,558,896 | Young et al. | July 3, 1951 |

FOREIGN PATENTS

| | | |
|---|---|---|
| 373,786 | Great Britain | June 2, 1932 |
| 804,230 | France | July 27, 1936 |
| 471,218 | Great Britain | Aug. 31, 1937 |
| 492,879 | Great Britain | Sept. 28, 1938 |